United States Patent
Miedema

(10) Patent No.: US 12,063,279 B2
(45) Date of Patent: Aug. 13, 2024

(54) METHOD AND APPARATUS TO SELF-DOCUMENT CONFIGURATION IN DISTRIBUTED MICROSERVICE ARCHITECTURES

(71) Applicant: CIENA CORPORATION, Hanover, MD (US)

(72) Inventor: David Miedema, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 17/701,838

(22) Filed: Mar. 23, 2022

(65) Prior Publication Data

US 2023/0319150 A1    Oct. 5, 2023

(51) Int. Cl.
*H04L 67/51*     (2022.01)
*H04L 41/0853*   (2022.01)
*H04L 41/22*     (2022.01)
*H04L 67/133*    (2022.01)

(52) U.S. Cl.
CPC .......... *H04L 67/51* (2022.05); *H04L 41/0856* (2013.01); *H04L 41/22* (2013.01); *H04L 67/133* (2022.05)

(58) Field of Classification Search
CPC ....... H04L 67/51; H04L 67/133; H04L 41/22; H04L 41/0856
See application file for complete search history.

(56) References Cited

U.S. PATENT DOCUMENTS

| | | | |
|---|---|---|---|
| 7,349,960 B1* | 3/2008 | Pothier | H04L 41/0806 709/224 |
| 9,552,232 B2* | 1/2017 | Mukherjee | H04L 67/51 |
| 11,169,862 B2* | 11/2021 | Miedema | G06F 9/546 |
| 2003/0038842 A1* | 2/2003 | Peck | G06F 11/263 715/763 |
| 2020/0162328 A1* | 5/2020 | Valenza | H04L 41/0886 |

OTHER PUBLICATIONS

Iijima, Tomoyuki, et al. "Development of NETCONF-Based Network Management Systems in Web Services Framework." IEICE transactions on communications 92.4: 1104-1111. (Year: 2009).*

(Continued)

*Primary Examiner* — John M MacIlwinen
(74) *Attorney, Agent, or Firm* — Guntin & Gust, PLC; Atanu Das

(57) ABSTRACT

Aspects of the subject disclosure may include, for example, receiving, over a communication network via a user interface, a first request for first sample data for a first parameter associated with a first microservice. The first sample data is associated with a first portion of communication equipment. The server is configured to perform the first microservice. Further embodiments include identifying a first group of values for the first parameter based on the first portion of communication equipment and the first microservice. Additional embodiments can include providing, over the communication network, the first group of values for the first parameter to the user interface as the first sample data. The user interface presents the first group of values for the first parameter as the first sample data on a display. Other embodiments are disclosed.

20 Claims, 13 Drawing Sheets

(56) References Cited

OTHER PUBLICATIONS

Schönwälder, Jürgen, Martin Björklund, and Phil Shafer. "Network configuration management using NETCONF and YANG." IEEE communications magazine 48.9: 166-173. (Year: 2010).*

Ed-Douibi, Hamza, Javier Luis Cánovas Izquierdo, and Jordi Cabot. "Automatic generation of test cases for REST APIs: A specification-based approach." 2018 IEEE 22nd international enterprise distributed object computing conference (EDOC). IEEE. (Year: 2018).*

* cited by examiner

```
>service# set slots 1 config card part-no <TAB> (Show part numbers of cards that can be provisioned in slot 1)
XX-01  XX-03  XX-05  YY-01
XX-02  XX-04  XX-06  <string>

>service# set slots 1 config card part-no XX-01 (Provision a card in slot 1)

>service# sets slots 1 config card part-no <TAB> (Show types of cards provisioned in slot 2 given provision of slot 1)
XX-03  YY-01
XX-06  <string>

>service# sets slots 2 config card part-no XX-03 (Provision a card in slot 2)
```

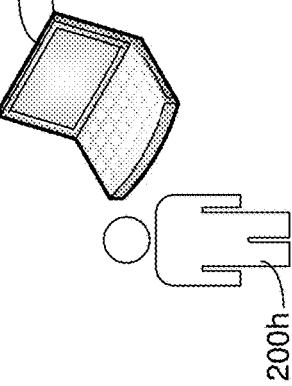

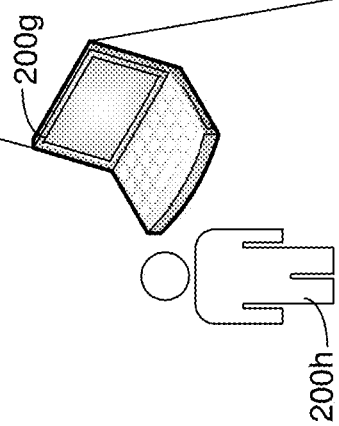

```
>service# show chassis
chassis          Value
Name             Ottawa
part-no          012-3456-789
type             8-slot DC powered chassis
serial-number    XX338SLOT001
manufacturing-date 2018-12-31T00:00:00z
mac-address      00:20:d8:00:35:07

>service# set slots 1 config card part-no <TAB>
012-2341-134  012-2342-642  012-2342-111
012-2341-135  012-2342-241  012-2344-424
012-2341-136  012-2342-012  <string>

>service# set slots 2 config card part-no <TAB>
012-2341-134  012-2342-642  012-2342-111
012-2341-135  012-2342-241  012-2344-424
012-2341-136  012-2342-012  <string>

>service# set slots 1 config card part-no 012-2341-134
>service# set slots 2 config card part-no <TAB>
012-2341-134  012-2344-424  012-2342-111
012-2341-136  <string>

>service# show-sample slots 2 config card
name  part-no         type                  form-factor  slot-type
2     012-2341-134    10 Gig, 1355nm        backplane    standard
2     012-2344-424    10 Gig, 1560nm        backplane    standard
2     012-2342-111    100 Gig, 1355nm       backplane    high-power
2     012-2341-136    10/100 Gig, Tunable   backplane    high-power
```

```
>service# set slots 1 config amps Booster-Cband gain-mode high target-gain <TAB>
>service# set slots 1 config amps Booster-Cband gain-mode high target-gain 25

>service# set slots 1 config amps Booster-Cband gain-mode low target-gain <TAB>
>service# set slots 1 config amps Booster-Cband gain-mode low target-gain 13
```

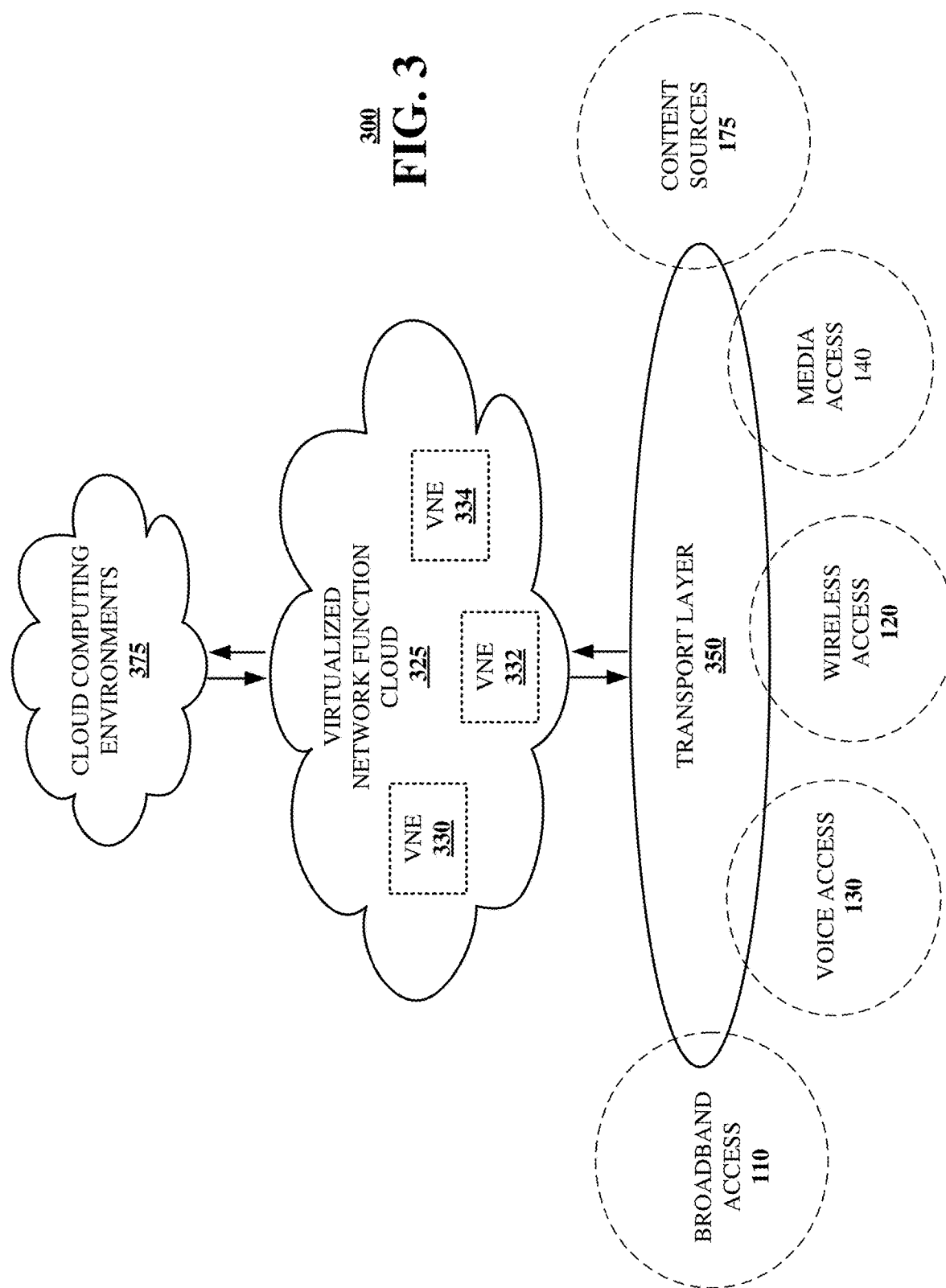

METHOD AND APPARATUS TO SELF-DOCUMENT CONFIGURATION IN DISTRIBUTED MICROSERVICE ARCHITECTURES

FIELD OF THE DISCLOSURE

The subject disclosure relates to a method and apparatus to self-document configuration in distributed microservice architectures.

BACKGROUND

Management of communication equipment can comprise a Service-Oriented Architecture (SOA) that is an approach in computer software design in which application components provide services (e.g., provisioning, status, alarm, etc.) to other components via a communication protocol over a communication network. The advantages of a service-orientation approach include independence from any vendor, product, technology, etc. A service can be a self-contained unit of functionality. Further, services can be combined to provide the functionality of a large software application. In addition, a computer or server can perform a group of services, and each service can be constructed to ensure that the service can exchange information with any other service in the communication network without human intervention and without the need to modify the underlying computer program supporting the service. Microservices are a variant of SOA used to develop distributed software systems. Similar to SOA, services in a Microservice Architecture (MSA) are processes that communicate with each other over the communication network to achieve an objective, and these services use technology-agnostic protocols. In a Microservice Architecture, services can be small, and the protocols should be lightweight. The benefit of distributing different responsibilities of the system into different smaller services enhances their cohesion and decreases their coupling. This makes it much easier to modify and add functions as well as qualities to the system at any time. One example of a distributed system that uses services is a network element in a telecommunications network, e.g., an optical network element, router, switch, etc.

In the current state of the art, client user interfaces can be used to provision microservices on communication equipment utilized in a communication network. Further, administration personnel associated with the operator of the communication network may need to sample data to understand the way in which to provision a particular microservice. However, the current state of the art has client user interfaces provide sample data for syntax only because to provide a more detailed sample state would require that the sample data generated at a client user interface be recoded every time the rules for validity for provisioning the microservice are updated.

BRIEF DESCRIPTION OF THE DRAWINGS

Reference will now be made to the accompanying drawings, which are not necessarily drawn to scale, and wherein:

FIGS. 2A-2H are block diagrams illustrating example, non-limiting embodiments of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
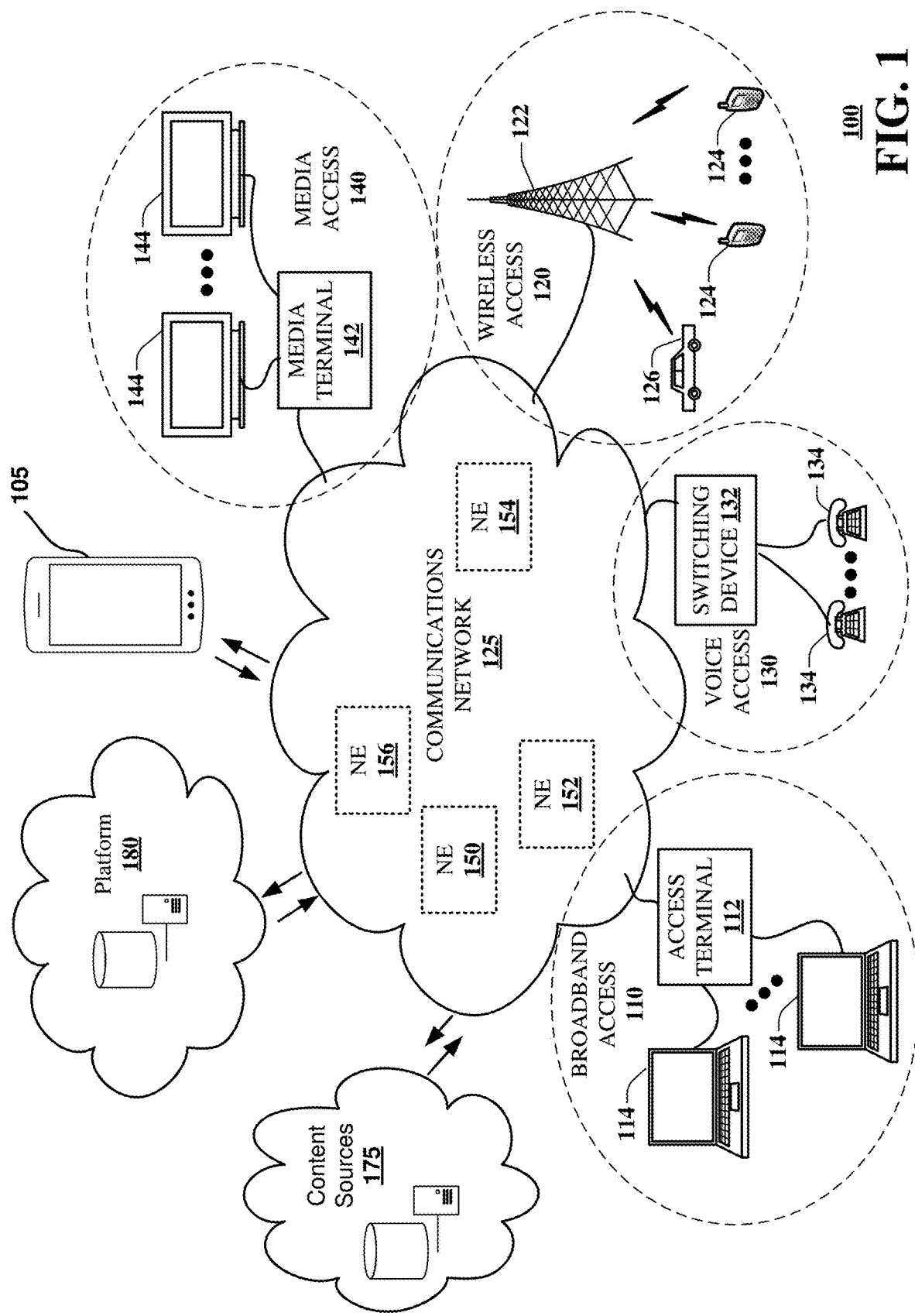
FIG. 1 is a block diagram illustrating an exemplary, non-limiting embodiment of a communications network in accordance with various aspects described herein.

The subject disclosure describes, among other things, illustrative embodiments for providing possible and valid configuration options such as through use of generic interfaces in a distributed microservice. In one or more embodiments, the options can be provided without the interface having any prior knowledge of the models or current configuration. In one or more embodiments, the generation of sample data can be shifted from a client/interface to a server and messaging Application Programming Interfaces (APIs) can be provided to the server that allow runtime context-aware sample data to be generated by the server and presented over any interface to any client. In one or more embodiments, the logic of the sample configuration data can be distributed to each of the services. In one or more embodiments, the services can expand on the sample data from other services so as to provide runtime-valid sample configuration data. In one or more embodiments, the presentation of valid options to a user can be facilitated without interfaces being required to code or interpret particular rules. As an example a first request can be received, over a communication network via a user interface, where the first request is for first sample data for a first parameter associated with a first microservice. The first sample data is associated with a first portion of communication equipment. The server is configured to perform the first microservice. Further embodiments can include identifying a first group of values for the first parameter based on the first portion of communication equipment and the first microservice. Additional embodiments can include providing, over the communication network, the first group of values for the first parameter to the user interface as the first sample data. The user interface presents the first group of values for the first parameter as the first sample data on a display. Other embodiments are described in the subject disclosure.

One or more aspects of the subject disclosure include a distributed microservices system, comprising a server including a processor, and memory that stores executable instructions that, when executed by the server, facilitate performance of operations. The operations can comprise receiving, over a communication network via a user interface, a first request for first sample data for a first parameter associated with a first microservice. The first sample data is associated with a first portion of communication equipment. The server is configured to perform the first microservice. Further, the operations can comprise identifying a first group of values for the first parameter based on the first portion of communication equipment and the first microservice. In addition, the operations comprise providing, over the communication network, the first group of values for the first parameter to the user interface as the first sample data. The user interface presents the first group of values for the first parameter as the first sample data on a display.

One or more aspects of the subject disclosure include a non-transitory machine-readable storage medium, comprising executable instructions that, when executed by a server including a processor, facilitate performance of operations. The operations can comprise receiving, over a communication network via a user interface, a first request for first sample data for a first parameter associated with a first microservice. The first sample data is associated with a first portion of communication equipment. The server is configured to perform the first microservice. Further, the user interface receives first user-generated input that indicates the first request for the first sample data, the user interface provides the first request for the first sample data to the server, the user interface generates metadata that comprises the first request for the first sample data, and the user interface providing of the first request for the first sample data comprises providing the metadata in a messaging layer of a messaging protocol associated with a message that includes the metadata to the server. Additional operations can comprise identifying a first group of values for the first parameter based on the first portion of communication equipment and the first microservice. Also, the operations can comprise providing, over the communication network, the first group of values for the first parameter to the user interface as the first sample data. The user interface presents the first group of values for the first parameter as the first sample data on a display.

One or more aspects of the subject disclosure include a method, comprising receiving, by a server including a processor, over a communication network via a user interface, a first request for first sample data for a first parameter associated with a first microservice. The first sample data is associated with a first portion of communication equipment. The server is configured to perform the first microservice. Further, the method can comprise identifying, by the server, a first group of values for the first parameter based on the first portion of communication equipment and the first microservice, and providing, by the server, over the communication network, the first group of values for the first parameter to the user interface as the first sample data. The user interface presents the first group of values for the first parameter as the first sample data on a display. In addition, the method can comprise the receiving, by the server, second user-generated input from the user interface that indicates configuring the first parameter to a first value from the first group of values, and configuring, by the server, the first parameter to the first value of the first group of values according to the second user-generated input. Also, the method can comprise receiving, by the server, over the communication network via the user interface, a second request for second sample data for a second parameter associated with a second microservice. The second sample data is associated with a second portion of communication equipment, and the server is configured to perform the second microservice. Further, the method can comprise identifying, by the server, a second group of values for the second parameter based on the second portion of the communication equipment, the second microservice, and the first value of the first parameter, and providing, by the server, over the communication network, the second group of values for the second parameter to the user interface as the second sample data. The user interface presents the second group of values for the second parameter as the second sample data on the display.

Referring now to FIG. 1, a block diagram is shown illustrating an example, non-limiting embodiment of a system 100 in accordance with various aspects described herein. For example, system 100 can facilitate in whole or in part a request, via a user interface, for sample data from a server supporting a service associated with a portion of communication equipment and the server providing the sample data to the user interface for display.

System 100 can include one or more platforms 180 for providing communication to end user device(s) 105 by way of communication network 125. In one or more embodiments, the platform 180 can provide services utilizing, or otherwise being supported by, distributed and dynamically deployed microservices. As described herein, system 100 allows for management of possible and valid configurations options in the distributed microservice environment such as by insertion of metadata in a messaging layer that can be forwarded to all microservices, and extraction of a request for sample data from a client. That is, insertion of this sample data request as metadata to the message, and enablement of services to extract this metadata from the system when a sample data is being requested for the current datastore or an in-progress transaction, can also include returning this sample data from the services to be combined into a dynamic response, and/or display via an interface of the sample configuration data to the client. The platform(s) can include various software and hardware such as devices, servers or other equipment (including cloud-based resources and processing) that allows the platforms to perform various computing functionality, such as described herein. For instance, the end user device 105 (e.g., a mobile phone although other end user devices can also be utilized, such as desktop or laptop computers, tablets, gaming console, etc., which can access, transmit and receive data via a hardwire and/or wireless technology) is being provided a service(s) based at least in part on transmitting and receiving data over the network 125. In some embodiments, a platform can comprise one or more of network element 150, network element 152, network element 154, and network element 156 (or other network elements) within communication network 125 to facilitate communication between end user devices.

In particular, the communications network 125 can provide broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 can be coupled to one or more content sources 175 of audio, video, graphics, text and/or other media, which can include Content Delivery Networks (CDNs). While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on). In one or more embodiments, end user devices can communicate via network 125 via any of the forms of access including broadband access 110, wireless access 120, voice access 130, media access 140 and combinations thereof.

The communications network 125 can include any number of network devices such as network elements (NE) 150, 152, 154, 156, etc. for facilitating the broadband access 110, wireless access 120, voice access 130, media access 140 and/or the distribution of content from content sources 175. The communications network 125 can also include various types of networks such as one or more of a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices. In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices. In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 can include broadcast television and radio sources, video on demand platforms and streaming video and audio services platforms, one or more content data networks, data servers, web servers and other content servers, and/or other sources of media. In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
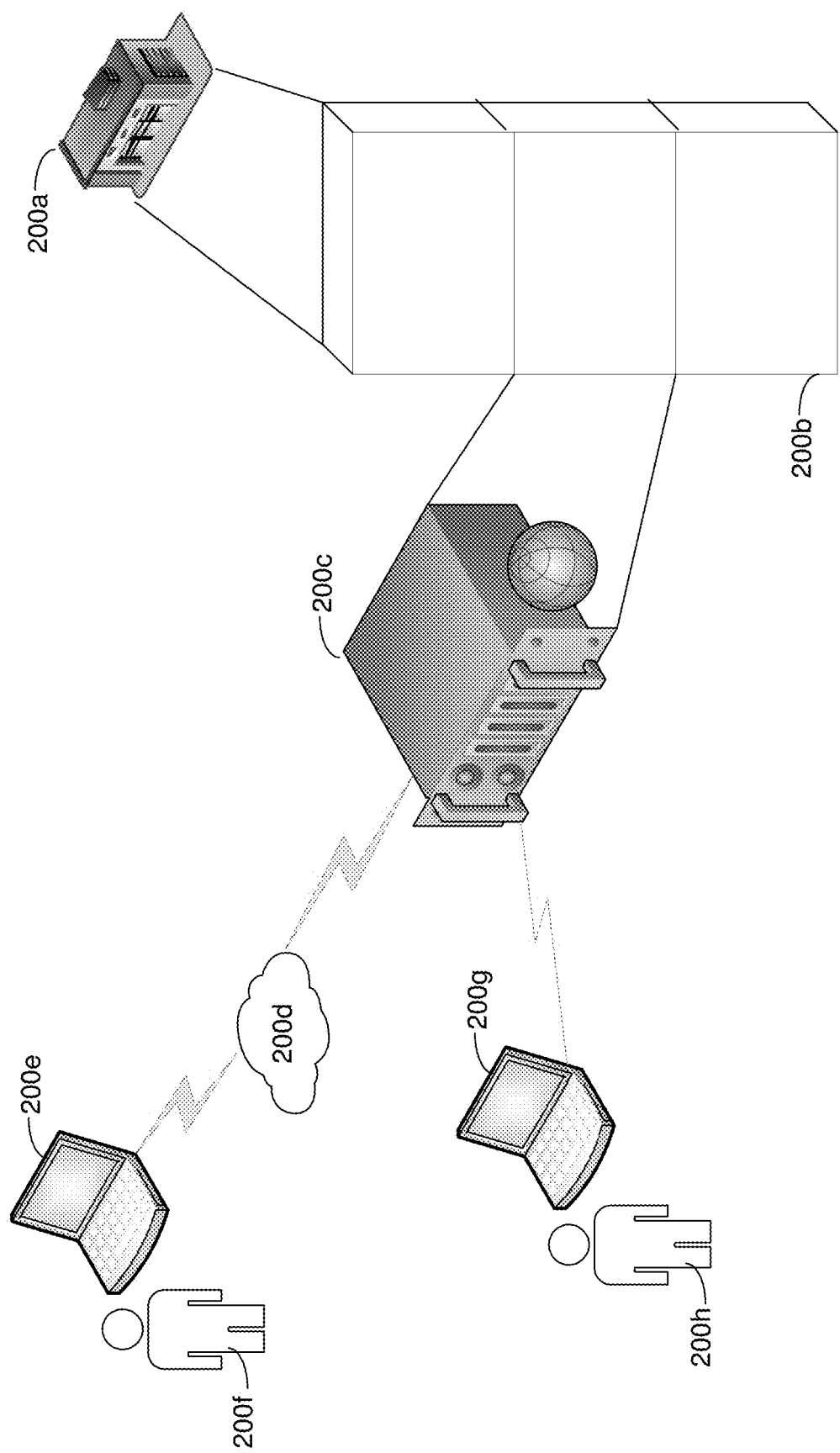

FIGS. 2A-2H are block diagrams illustrating example, non-limiting embodiments of a system functioning within the communication network of FIG. 1 in accordance with various aspects described herein. Referring to FIG. 2A, in one or more embodiments, system 200 can comprise a piece of communication equipment 200c that can be within a rack/cabinet of communication equipment 200b within an operations center (or other facility or location) for an operator of a communication network (e.g., mobile communication network, a telephone communication network, data communication network and/or a combination thereof). Further, the communication equipment 200c can be managed by administration personnel 200h via a client user interface running on a personal computing device 200g (e.g., laptop computer, tablet computer, mobile phone, desktop computer, etc.) communicatively coupled to the communication equipment 200c locally. In other embodiments, the communication equipment 200c can be managed by administration personnel 200f via a client user interface running on a personal computing device 200e (e.g., laptop computer, tablet computer, mobile phone, desktop computer, etc.) communicatively coupled to the communication equipment 200c over communication network 200d. The communication network can comprise a wireless communication network, wired communication network or a combination thereof. Communication equipment 200c can include functionality of a Multi-Service Provisioning Platform (MSPP), Digital Cross-Connect (DCS), Ethernet and/or Optical Transport, Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the communication equipment 200c can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the communication equipment 200c can be a system with ingress and egress digital and/or optical signals and switching of channels, timeslots, tributary units, etc. Also, communication equipment 200c can be a system with ingress and egress of optical signals and switching/routing of wavelengths. Of course, the communication equipment 200c can combine both digital signals and optical signals. Communication equipment 200c can be contemplated for use with any distributed system.

In one or more embodiments, administration personnel 200f may want to provision different parameters on the communication equipment 200c associated with one or more (micro)services utilizing a client user interface on personal computing device 200c. However, prior to provisioning any parameter, the administration personnel 200f may want to request to see sample data associated with the parameter from a server supporting the service associated with the parameter. Legacy client user interfaces can generate and provide sample data that include sample strings, syntax or information, however, none can be validated in the context of a model associated with the communication equipment or compatible relative to other data or parameters in the system. Further, there are several shortcomings in having the client user interface generate the sample data for a parameter associated with a service. These can include the need for customization when services in the deployment of the communication equipment 200c change, when model associated with the communication equipment 200c expand, when the set of valid data associated with the communication equipment 200c expand, when the rules for semantic validity change, in order to capture runtime relationships, and in order to show valid sample data in the context of an in-flight transaction or candidate datastore that has not yet been committed in the system. To address such shortcomings, the sample data should be generated by the server configured to provide the service associated with the parameter as described herein.

Figure 2B:
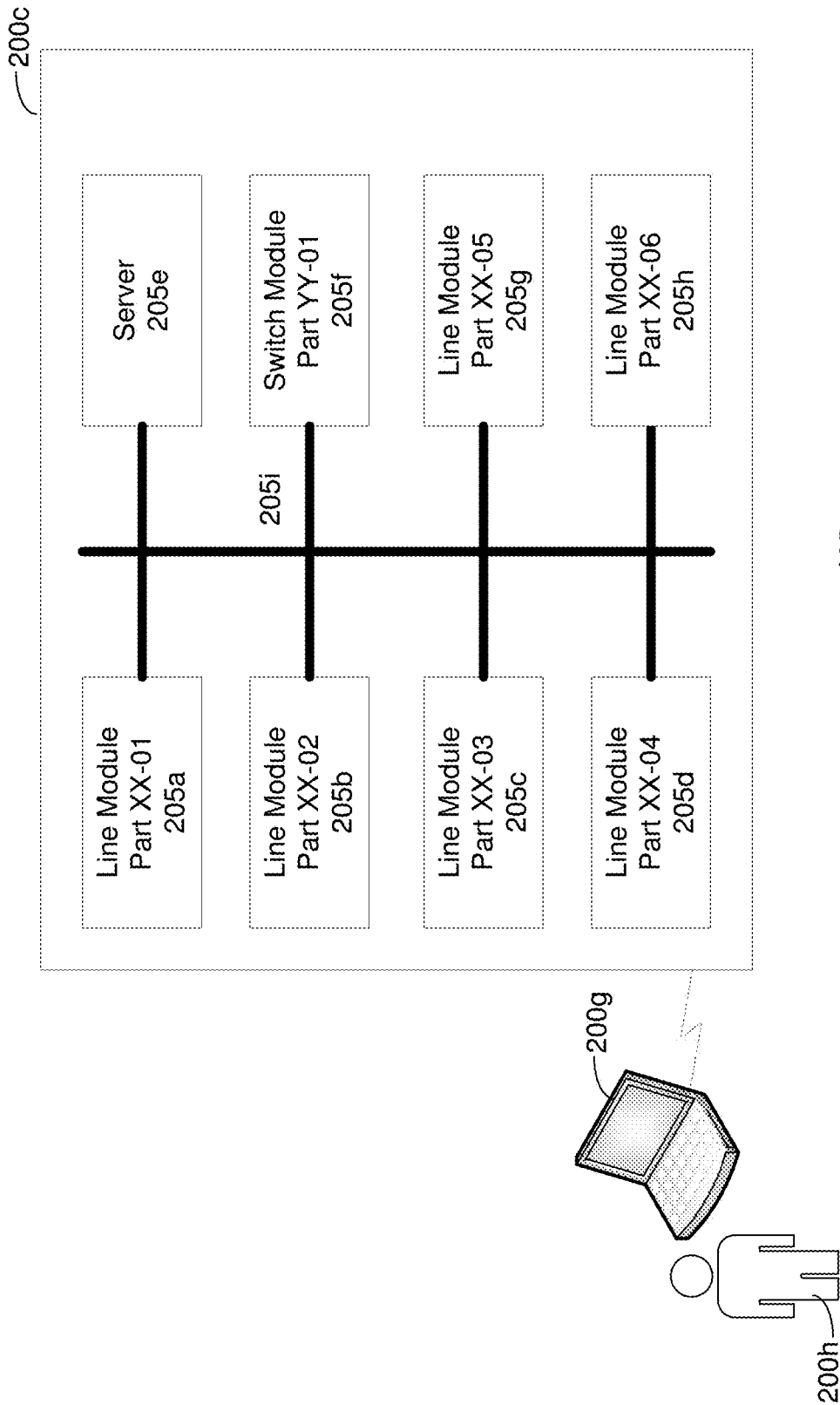

Referring to FIG. 2B, in one or more embodiments, system 205 comprises communication equipment 200c that is communicatively coupled to personal computing device 200g associated with administration personnel 200h. The communication equipment 200c can comprise line module 205a, line module 205b, line module 205c, line module 205d, server 205e (within a common equipment module), switch module 205f, line module 205g, and line module 205h all communicatively coupled to each other over (internal) communication network 205i. The server 205e can support one or more services associated with line module 205a, line module 205b, line module 205c, line module 205d, switch module 205f, line module 205g, and line module 205h that can include provision one of them different slots of the communication equipment 200c. It should be understood that other components and arrangements for communication equipment 200c can be utilized in one or more of the embodiments described herein so that possible and valid configuration options can be provided such as through use of a generic interface in a distributed microservice environment. Embodiments herein describe cards and slots in a modular arrangement, however, one or more of the embodiments can utilize other techniques and structures for providing equipment (and components thereof) that is configurable and that can support or otherwise be utilized with a distributed microservice environment.

Referring to FIG. 2C, in one or more embodiments, system 210 can comprise administration personnel 200h interacting with a client user interface 210a running on personal computing device 200g. The client user interface can comprise a Command Line Interface (CLI) and can be used to provision communication equipment 200c as shown in FIG. 2A and FIG. 2B. A first command can request sample data to show the part numbers of the cards/modules that can be provisioned in slot 1 of the communication equipment 200c. A second command can provision a particular card in slot 1 of the communication equipment 200c. A third command can request sample data to show the part numbers of the cards/modules that can be provisioned in slot 2 of the communication equipment 200c given the provision of the particular card in slot 1. A fourth command can provision a particular card in slot 2 of the communication equipment 200c.

Referring to FIG. 2D, in one or more embodiments, system 212 can comprise administration personnel 200h interacting with a client user interface 212a running on personal computing device 200g. The client user interface can comprise a Command Line Interface (CLI) and can be used to provision communication equipment 200c as shown in FIG. 2A and FIG. 2B. A first command can request to show the information associated with the chassis of communication equipment 200c. This can include the name of the communication equipment, the part number, the communication equipment type, serial number, manufacturing date, and MAC address. A second command can request to show the types of cards/modules that can be provisioned in slot 1 of communication equipment 200c as sample data. A response to the second command can include a listing of sample data that includes the part number for each of the eight cards/modules residing within the communication equipment 200c. A third command can request to show the types of cards/modules that can be provisioned in slot 2 of communication equipment 200c as sample data. A response to the third command can include a listing of sample data that includes the part number for each of the eight cards/modules residing within the communication equipment 200c. A fourth command can provision card/module with part number 012-2341-134 into slot 1 of communication equipment 200c. A fifth command can request to show the types of cards/modules that can be provisioned in slot 2 of communication equipment 200c given card/module with part number 012-2341-134 is provisioned in slot 1 as sample data. A response to the fifth command can include a listing of sample data that includes the part number for each of four cards/modules within the communication equipment 200c that can be compatible of the card/module provisioned in slot 1. A sixth command can include a "show-sample" command that can display more sample data associated with each of the card/module that can be provisioned in slot from the server providing the associated service.

Figure 2E:
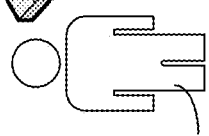

Referring to FIG. 2E, in one or more embodiments, system 214 can comprise administration personnel 200h interacting with a client user interface 214a running on personal computing device 200g. The client user interface can comprise a Command Line Interface (CLI) and can be used to provision communication equipment 200c as shown in FIG. 2A and FIG. 2B. A first command and second command provision the gain-mode to be "high" by performing a tab completion to a gain target applicable to a high gain mode. A third command and fourth command provision the gain-mode to be "low" by performing a tab completion to a gain target applicable to a low gain mode.

Figure 2F:
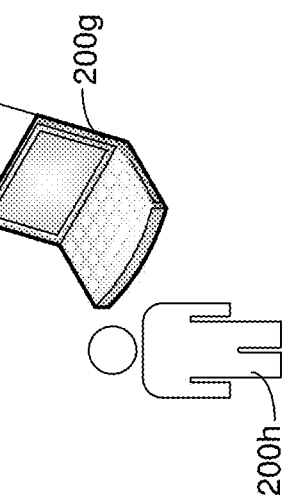

Referring to FIG. 2F, in one or more embodiments, system 214 can comprise administration personnel 200h interacting with a client user interface 214a running on personal computing device 200g. The client user interface can comprise a Command Line Interface (CLI) and can be used to provision communication equipment 200c as shown in FIG. 2A and FIG. 2B. In the set of six commands shown in FIG. 2F, a batch transaction is initiated in which the data is being staged before it is committed, but services can see the staged data. In the first three commands, a given part number is provided for a card/module that includes amplifiers for both C band and L band. Tab completion can be performed on the permitted keys for the amplifier objects on this slow are not reported for the card/module provisioned in the transaction. If the card is re-provisioned to be a different variant (e.g., only C band), the keys for the amplifiers will be different based on the staged data in the transaction.

Figure 2G:
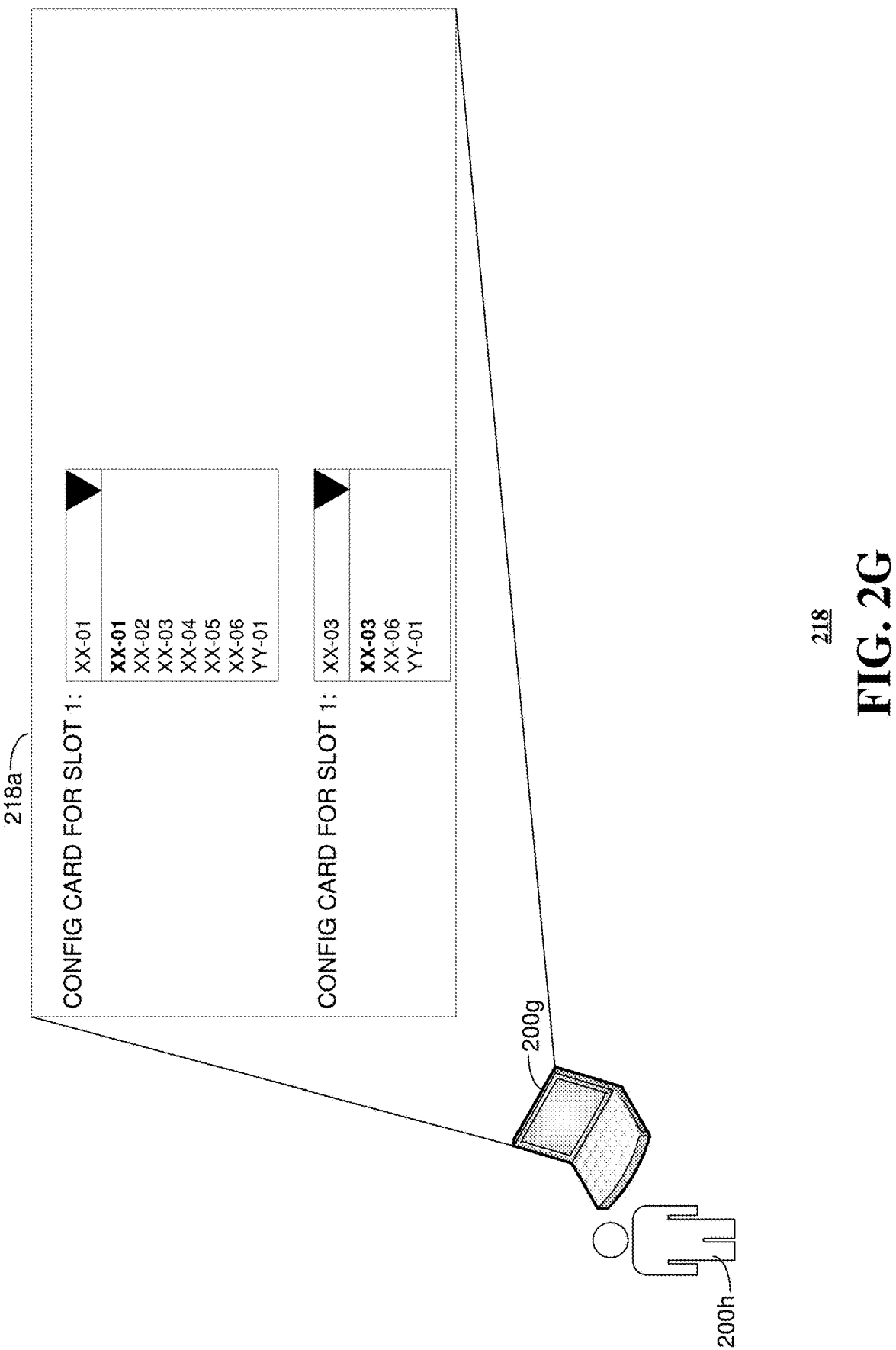

Referring to FIG. 2G, in one or more embodiments, system 218 can comprise administration personnel 200h interacting with a client user interface 218a running on personal computing device 200g. The client user interface 218a can comprise a web browser and can be used to provision communication equipment 200c as shown in FIG. 2A and FIG. 2B. The web browser can comprise a first drop down menu to configure a card/module for slot 1. The administration personnel 200h can click the arrow such that the web browser can request sample data for the parameter (i.e., the different cards/modules available to be provisioned in slot 1 from the server supporting the service). The server can provide the sample data such that the drop down menu lists the available part numbers of the cards/module available to be provisioned on slot 1. Further, the administration personnel can click the part number of a card/module (e.g., XX-01) that can be provisioned in slot 1. In addition, the web browser can comprise a second drop down menu to configure a card/module for slot 2 given that the card/module associated with part number XX-01 has been provisioned in slot 1. The administration personnel 200h can click the arrow such that the web browser can request sample data for the parameter (i.e., the different cards/modules available to be provisioned in slot 31 from the server supporting the service). The server can provide the sample data such that the drop down menu lists the available part numbers of the cards/module available to be provisioned in slot 2 given that the card/module associated with part number XX-01 has been provisioned in slot 2. Further, the administration personnel can click the part number of a card/module (e.g., XX-03) that can be provisioned in slot 2.

Figure 2H:
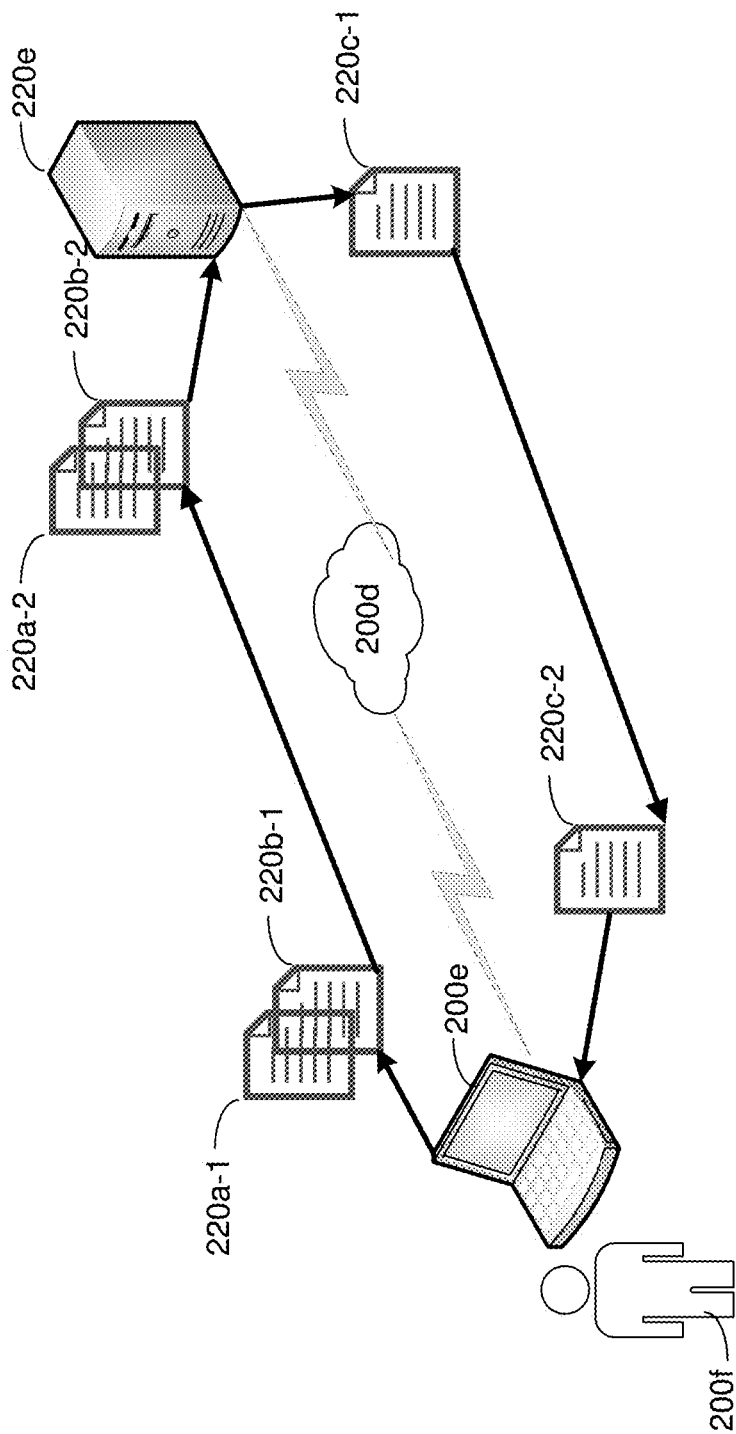

Referring to FIG. 2H, in one or more embodiments, a system 220 can comprise a personal computing device 200e operated by administration personnel 200f that can be used to provision parameters of service, over a communication network 200d, on communication equipment that is supported by a server 220e (e.g., server 220e can be a server 205e on communication equipment 200c in FIG. 2B). The administration personnel can utilize a client user interface running on the personal computing device 200e to provision the parameters of a service supported by server 220e associated with the communication equipment. The client user interface can send a message 220a-1 to the server 220e along with metadata 220b-1 inserted into the messaging layer of communication protocol at a first time instance such that the metadata comprises the request for sample data for a parameter associated with a service supported by the server 220c. Further, at a second time instance, the server 220e can receive the message and extract the metadata from the messaging layer of the communication protocol. In response, the server 220e can generate and transmit sample data 220c-1 associated with the parameter at a third time instance. At a fourth instance, the client user interface can receive sample data 220c-2 from the server 220e and present the sample data on the display associated with the client user interface. In some embodiments, the display can be in a remote location to the server.

In one or more embodiments, a command can be issued at client user interface to obtain sample data. Examples can include CLI: show-sample; Netconf: <datastore>sample</datastore>; and REST: http://api?sample. Further, the command can be sent to service framework with the flag (e.g., metadata) to indicate sample data is requested. Servers that support services on the backend of communication equipment receive this message and compute single, partial, or complete sample data for the object requested. In addition, other services can use this sample data as the basis to compute additional sample data for child nodes or related data. Also, data from all services are collected and trimmed if needed to make the response cohesive (ensure all generated references meet the rules of the model). Further, sample data from the queries can be used to show explicit sample data, or to drive help-text such as: CLI: tab-completion and "?" help text for a command that is being composed; REST: Swagger page can be amended to show valid options in the page; and GUI: Allows drop-down and radio buttons to be crafted that only show valid options and provide additional contextual data to allow the proper selections.

For example, a user (e.g., administration personnel) requests sample data for an unprovisioned shelf associated with communication equipment. The shelf object determines the possible types of shelves that can be provisioned for the current chassis of the communication equipment. In response, sets of sample data are returned to be displayed by the client user interface. Note in this case, the "shelf" object may be a container, but the set of sample data needs to be listed, such that the results of the sample data response need to be able to return lists of containers, when a list is not provided explicitly in the schema. Further, the user selects a shelf from the sample data and provisions it in a transaction or candidate datastore. In addition, the user requests sample data for slot-1. The system can expand the provisioned shelf in the datastore to include all the slots in the system. Based on the rules for the shelf, the system can find all circuit-packs that can be provisioned in this slot. List of circuit-pack codes for slot-1 can be returned in sample data responses. A user can then select a circuit-pack from the sample data list and provisions it in the transaction or the candidate. Further, the user can request sample data for slot-2. The system now understands that the list of circuit-packs available to be provisioned in slot-2 is now constrained by both the shelf-type and the current provisioning in slot-1 and can return a set of sample data that is valid under those conditions.

In one or more embodiments, a client user interface can include various types of user interfaces. These types of user interfaces can include a graphical user interface with icons/objects representing cards/modules, slots, components, etc. of communication equipment and can provide drag and drop features to provision a card/module into a slot, for example.

Figure 2I:
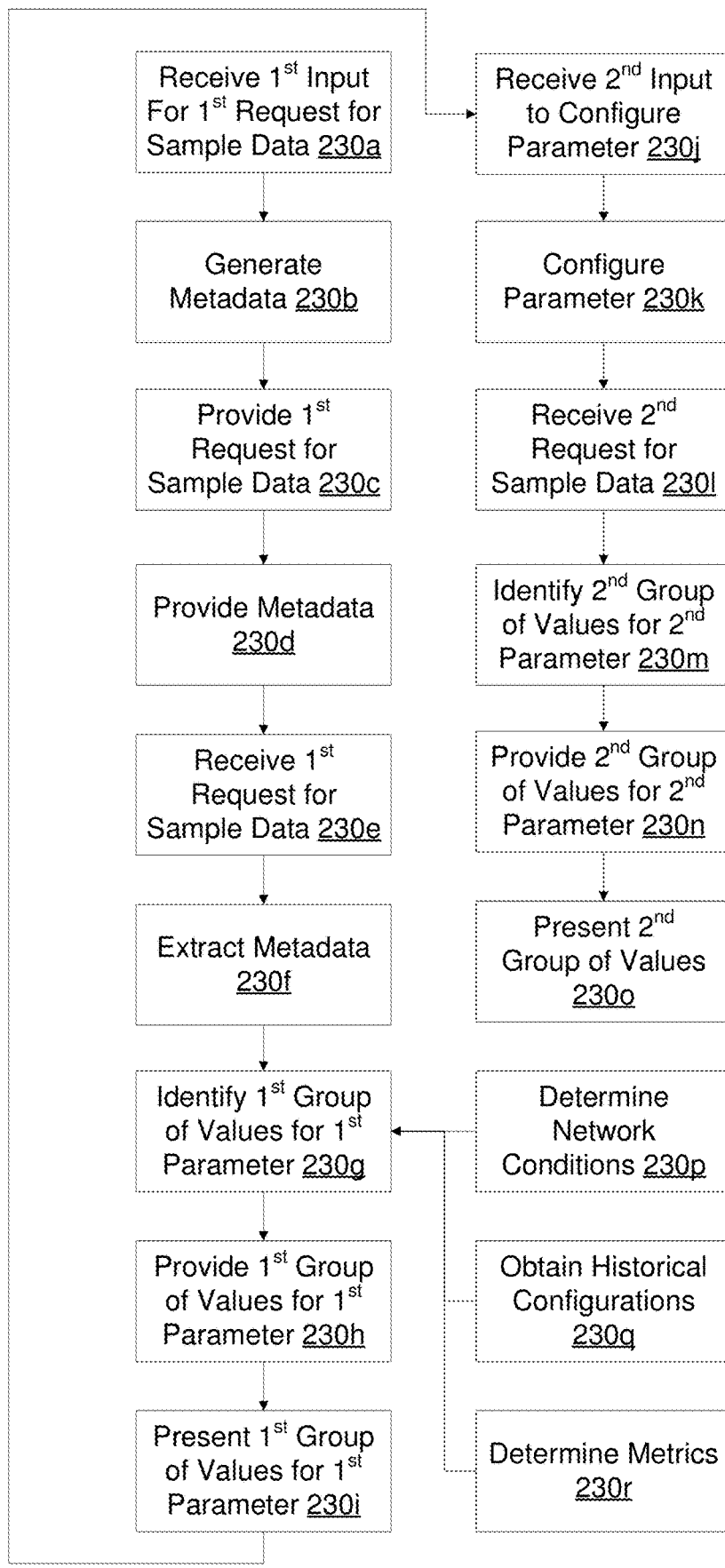
FIG. 2I depicts an illustrative embodiment of a method in accordance with various aspects described herein.

FIG. 2I depicts an illustrative embodiment of a method 230 in accordance with various aspects described herein. Aspects of a method 230 can be performed by a client user interface or a server, as described herein. The method 230 can include the client user interface, at 230a, receiving first user-generated input that indicates the first request for the first sample data for a first parameter associated with a first microservice. The first sample data is associated with a first portion of communication equipment, and the server is configured to perform the first microservice. Further, the method 230 can include the client user interface, at 230b, generating metadata that comprises the first request for the first sample data. In addition, the method 230 can include the client user interface, at 230c, providing the first request for the first sample data to the server, which can include the client user interface, at 230d, providing the metadata comprising the first request for first sample data. In some embodiments, the metadata can be provided in a messaging layer of a communication protocol associated with a message that includes the metadata to the server.

In one or more embodiments, the method 230 can include the server, at 230e, receiving, over a communication network via a user interface, the first request for first sample data for the first parameter associated with the first microservice. Further, the method 230 can include the server, at 230f, extracting the metadata from the messaging layer of the communication protocol associated with the message. In some embodiments, the receiving of the first request for the first sample data for the first parameter comprises extracting the metadata from the messaging layer. In addition, the method 230 can include the server, at 230g, identifying a first group of values for the first parameter based on the first portion of communication equipment and the first microservice. Also, the method 230 can include the server 230h, providing, over the communication network, the first group of values for the first parameter to the user interface as the first sample data. Further, the method can include the user interface 230i, presenting the first group of values for the first parameter as the first sample data on a display.

In one or more embodiments, the method 230 can include the server, at 230j, receiving second user-generated input from the user interface that indicates configuring the first parameter to a first value from the first group of values. Further, the method 230 can include the server, at 230k, configuring the first parameter to the first value of the first group of values according to the second user-generated input. In addition, the method 230 can include the server, at 230l, receiving, over the communication network via the user interface, a second request for second sample data for a second parameter associated with a second microservice. The second sample data is associated with a second portion of communication equipment, and the server is configured to perform the second microservice. Also, the method 230 can include the server, at 230m, identifying a second group of values for the second parameter based on the second portion of the communication equipment, the second microservice, and the first value of the first parameter. Further, the method 230 can include the server, at 230*n*, providing, over the communication network, the second group of values for the second parameter to the user interface as the second sample data. In addition, the method 230 can include the user interface, at 230*o*, presenting the second group of values for the second parameter as the second sample data on the display.

In one or more embodiments, the method 230 can include the server, at 230*p*, determining network conditions associated with the first portion of the communication equipment such that the identifying of the first group of values for the first parameter is based on the network conditions. Network conditions can include the amount bandwidth currently being consumed by a network on which the communication equipment facilitates transport of data (e.g., communication equipment is optical networking equipment and the network is an optical network, communication equipment is a digital cross-connect and the network is communicatively coupled to communication equipment/digital cross-connect), latency, jitter, throughput, etc.

Further, the method 230 can include the server, at 230*q*, obtaining historical configurations of the first parameter associated with the first portion of the communication equipment such that the identifying of the first group of values for the first parameter is based on the historical configurations. For example, a replacement card/module can be provisioned on the communication equipment. Administration personnel may like to provision the replacement card/module with the same parameters of the previous card/module that was replaced by the replacement card/module. The historical configurations can provide the values of the parameters of the previous card/module.

In addition, the method 230 can include the server, at 230*r*, determining network metrics associated with the first portion of the communication equipment such that the identifying of the first group of values for the first parameter is based on the network metrics. Further, network metrics can include goals of the operator for the network in which the communication equipment facilitates transport of data. For example, the network metrics can include metrics or threshold for bandwidth consumption, latency, jitter, throughput, errors, etc.

In one or more embodiments, a sample data to be presented by client user interface can include a listing of configuration options that are ranked or otherwise arranged in priority based on various factors including network conditions, cost, historical performance, predicted network conditions/changes, etc. In further embodiments, sample data can list options including suggested changes to configurations of other slots such as to improve network conditions, cost, etc. In additional embodiments, the sample data can list options that include predicted changes to network parameters/performance if a particular configuration is utilized.

In one or more embodiments, the communication equipment comprises a plurality of modules. The first portion of the communication equipment is one of the plurality of modules. Further, the user interface comprises one of a command line interface (CLI), network configuration protocol (NETCONF), representational state transfer (REST), or a web browser.

While for purposes of simplicity of explanation, the respective processes are shown and described as a series of blocks in FIG. 2I, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In some embodiments, one or more blocks can be performed in response to one or more other blocks.

Some portion of embodiments can be combined with portions of other embodiments.

FIG. 3 is a block diagram illustrating an example, non-limiting embodiment of a virtualized communication network in accordance with various aspects described herein. In one or more embodiments, a virtualized communication network can be used to implement some or all of the subsystems and functions of system 100, systems 200, 205, 210, 212, 214, 216, 218, 220 and/or methods 230, 300. For example, a virtualized communication network can facilitate in whole or in part a request, via a user interface, for sample data from a server supporting a service associated with a portion of communication equipment and the server providing the sample data to the user interface for display.

In particular, a cloud networking architecture can utilize a transport layer, a virtualized network function cloud and/or one or more cloud computing environments. In one or more embodiments, an open architecture can be implemented that leverages APIs and which meets customer requirements including traffic growth, diversity of traffic types, and diversity of performance and reliability expectations. In one embodiment, the virtualized communication network can employ virtual network elements (VNEs) that perform some or all of the functions of the network devices such as network elements 150, 152, 154, 156, etc. described with respect to FIG. 1. In one embodiment, the network architecture can provide a substrate of networking capability such as a Network Function Virtualization Infrastructure (NFVI) that is capable of being directed with software and Software Defined Networking (SDN) protocols to perform a broad variety of network functions and services. This infrastructure can include several types of substrates such as servers that support Network Function Virtualization (NFV). In one embodiment, packet forwarding capabilities based on generic computing resources can be implemented, with specialized network technologies utilized instead of general-purpose processors or general-purpose integrated circuit devices when they are not appropriate. In one embodiment, communication services can be implemented as cloud-centric workloads.

In one embodiment, edge router(s) can be implemented via VNEs composed of NFV software modules, merchant silicon, and associated controllers. Further, increasing workload consumes incremental resources from a common resource pool and/or such that resources are only consumed when needed. Other network elements such as other routers, switches, edge caches, and middle boxes, can be instantiated from the common resource pool. In one embodiment, the transport layer can include fiber, cable, wired and/or wireless transport elements, network elements and interfaces to provide broadband access 110, wireless access 120, voice access 130, media access 140 and/or access to content sources 175 for providing services and/or distribution of content to any or all of the access technologies. In one embodiment, the transport layer can include a network element(s) which is intended to be positioned at a specific place or has specific physical layer adapters that are not intended to be abstracted or virtualized.

In one or more embodiments, the virtualized network function cloud can interface with the transport layer to provide VNEs which provide specific NFVs. In one embodiment, the virtualized network function cloud can leverage cloud operations, applications, and architectures to support networking workloads. The VNEs can employ network function software that provides either a one-for-one mapping of traditional network element function or alternately some combination of network functions designed for cloud computing. In one embodiment, VNEs can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. In one embodiment, an orchestration approach can be used to instantiate the VNEs similar to those used in cloud compute services. In one or more embodiments, cloud computing environments can interface with the virtualized network function cloud via APIs that expose functional capabilities of the VNEs. For example, network workloads may have applications distributed across the virtualized network function cloud and cloud computing environment and in the commercial cloud or orchestrate workloads supported entirely in NFV infrastructure from these third-party locations.

Figure 4:
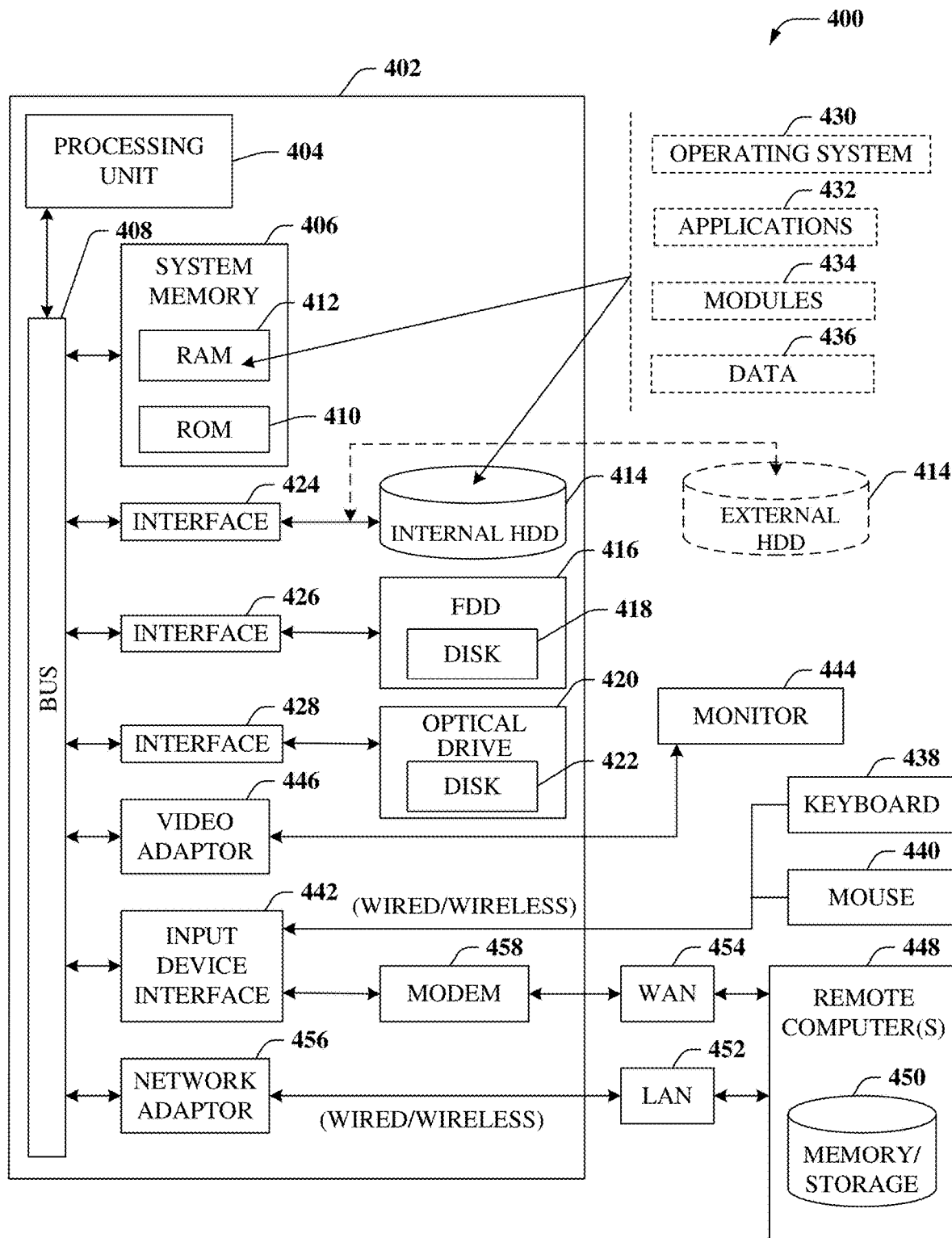
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, the computing environment 400 can be used in the implementation of network devices such as network elements 150, 152, 154, 156, access terminal 112, base station or access point 122, switching device 132, media terminal 142, and/or VNEs. Each of these devices can be implemented via computer-executable instructions that can run on one or more computers, and/or in combination with other program modules and/or as a combination of hardware and software. For example, computing environment 400 can facilitate in whole or in part a request, via a user interface, for sample data from a server supporting a service associated with a portion of communication equipment and the server providing the sample data to the user interface for display. Further, each of personal computing device 200*e*, personal computing device 200*g*, line module 205*a*, line module 205*b*, line module 205*c*, line module 205*d*, server 205*e*, switch module 205*f*, line module 205*g*, line module 205*h*, and server can comprise computing environment 400.

Generally, program modules perform particular tasks or implement particular abstract data types and comprise routines, programs, components, data structures, etc. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be stored in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. The processing unit can comprise dual microprocessors or other multiprocessor architectures.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for eaching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter or provide commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In one or more embodiments, a mobile network platform can be implemented via network devices such as network elements 150, 152, 154, 156, and/or VNEs. For example, the mobile network platform can facilitate in whole or in part a request, via a user interface, sample data from a server supporting a service associated with a portion of communication equipment and the server providing the sample data to the user interface for display. In one or more embodiments, the mobile network platform can generate and receive signals transmitted and received by base stations or access points such as base station or access point 122. The mobile network platform can comprise various components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. For example, the mobile network platform can be included in telecommunications carrier networks and can be considered carrier-side components as discussed elsewhere herein. In one embodiment, the mobile network platform can include CS gateway node(s) which can interface CS traffic received from legacy networks like telephony network(s) (e.g., public switched telephone network (PSTN), or public land mobile network (PLMN)) or a signaling system #7 (SS7) network. CS gateway node(s) can authorize and authenticate traffic (e.g., voice) arising from such networks, and CS gateway node(s) can access mobility, or roaming, data generated through SS7 network; for instance, mobility data stored in a visited location register (VLR), which can reside in memory. CS gateway node(s) can interface CS-based traffic and signaling and PS gateway node(s). As an example, in a 3GPP UMTS network, CS gateway node(s) can be realized at least in part in gateway GPRS support node(s) (GGSN). It should be appreciated that functionality and specific operation of CS gateway node(s), PS gateway node(s), and serving node(s), is provided and dictated by radio technology(ies) utilized by the mobile network platform for telecommunication over a radio access network with other devices, such as a radiotelephone.

In addition to receiving and processing CS-switched traffic and signaling. PS gateway node(s) can authorize and authenticate PS-based data sessions with served mobile devices. Data sessions can comprise traffic, or content(s), exchanged with networks external to the mobile network platform, like wide area network(s) (WANs), enterprise network(s), and service network(s), which can be embodied in local area network(s) (LANs), can also be interfaced with the mobile network platform through PS gateway node(s). It is to be noted that WANs and enterprise network(s) can embody, at least in part, a service network(s) like IP multimedia subsystem (IMS). Based on radio technology layer(s) available in technology resource(s) or radio access network, PS gateway node(s) can generate packet data protocol contexts when a data session is established; other data structures that facilitate routing of packetized data also can be generated. In one embodiment, PS gateway node(s) can comprise a tunnel interface (e.g., tunnel termination gateway (TTG) in 3GPP UMTS network(s) (not shown)) which can facilitate packetized communication with disparate wireless network(s), such as Wi-Fi networks.

In one embodiment, the mobile network platform can include serving node(s) that, based upon available radio technology layer(s) within technology resource(s) in the radio access network, convey the various packetized flows of data streams received through PS gateway node(s). In one embodiment for technology resource(s) that rely primarily on CS communication, server node(s) can deliver traffic without reliance on PS gateway node(s) such as embodied in a mobile switching center. As an example, in a 3GPP UMTS network, the serving node(s) can be embodied in serving GPRS support node(s) (SGSN).

For radio technologies that exploit packetized communication, server(s) in the mobile network platform can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by the mobile network platform. Data streams (e.g., content(s) that are part of a voice call or data session) can be conveyed to PS gateway node(s) for authorization/authentication and initiation of a data session, and to serving node(s) for communication thereafter. In addition to application server(s), server(s) can comprise utility server(s), a utility server can comprise a provisioning server, an operations and maintenance server, a security server that can implement at least in part a certificate authority and firewalls as well as other security mechanisms, and the like. In an aspect, security server(s) secure communication served through the mobile network platform to ensure network's operation and data integrity in addition to authorization and authentication procedures that CS gateway node(s) and PS gateway node(s) can enact. Moreover, provisioning server(s) can provision services from external network(s) like networks operated by a disparate service provider; for instance, WAN or Global Positioning System (GPS) network(s). Provisioning server(s) can also provision coverage through networks associated with the mobile network platform (e.g., deployed and operated by the same service provider), such as distributed antennas networks that enhance wireless service coverage by providing more network coverage.

It is to be noted that server(s) can comprise one or more processors configured to confer at least in part the functionality of the mobile network platform. For example, one or more processors can execute code instructions stored in memory. It should be appreciated that server(s) can comprise a content manager, which operates in substantially the same manner as described hereinbefore.

In one embodiment, memory can store information related to operation of the mobile network platform. Other operational information can comprise provisioning information of mobile devices served through mobile network platform, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory can also store information from at least one of telephony network(s), WAN, SS7 network, or enterprise network(s). In one embodiment, memory can be, for example, accessed as part of a data store component or as a remotely connected memory store.

Figure 5:
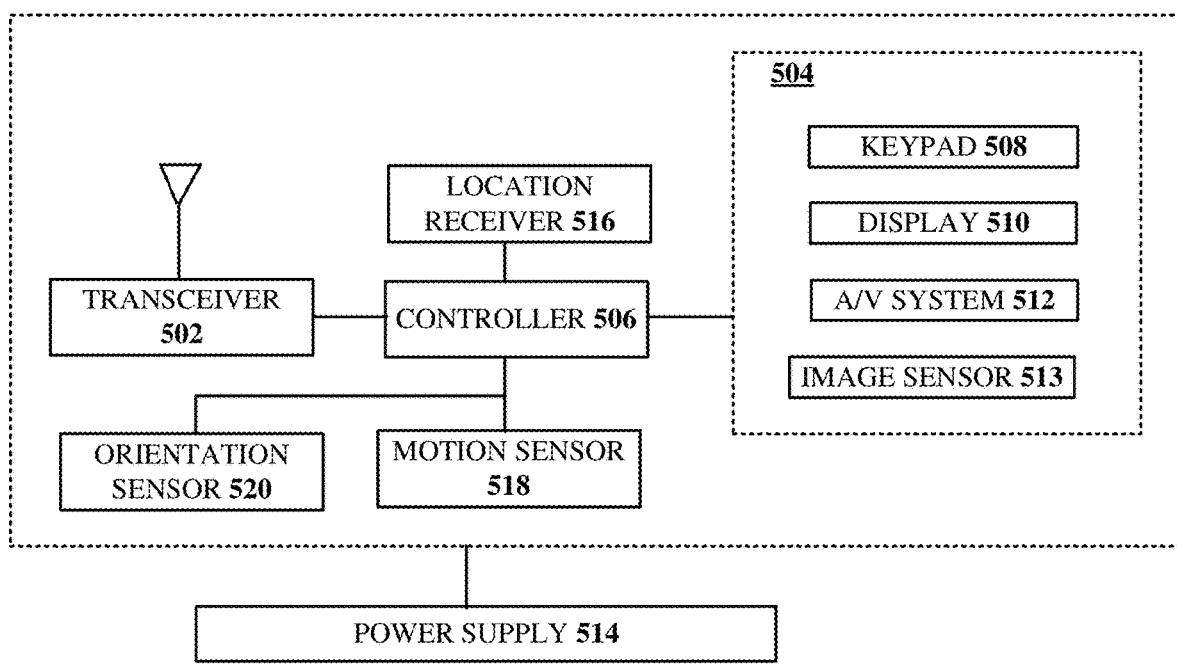
FIG. 5 is a block diagram of an example, non-limiting embodiment of a communication device in accordance with various aspects described herein.

Turning now to FIG. 5, an illustrative embodiment of a communication device 500 is shown, which can be various devices described herein such as end user device 105, data terminals 114, mobile devices 124, vehicle 126, display devices 144 or other client devices for communication via communications network 125. For example, communication device 500 can facilitate in whole or in part a request, via a user interface, for sample data from a server supporting a service associated with a portion of communication equipment and the server providing the sample data to the user interface for display. Further, each of personal computing device 200e, personal computing device 200g, line module 205a, line module 205b, line module 205c, line module 205d, server 205e, switch module 205f, line module 205g, line module 205h, and server can comprise communication device 500.

The communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can not only utilize touch screen technology but also serve as a user interface for detecting user input. As a touch screen display, the communication device 500 can be adapted to present a user interface having graphical user interface (GUI) elements that can be selected by a user with a touch of a finger. The display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high-volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable communications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=confidence(class)$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A distributed microservices system, comprising:
a server including a processor; and
memory that stores executable instructions that, when executed by the server, facilitate performance of operations, the operations comprising:
receiving, over a communication network via a user interface, a first request for first sample data for a first parameter associated with a first microservice, wherein the first sample data is associated with a first portion of a communication equipment, wherein the server is configured to perform the first microservice;
determining a second portion of the communication equipment is provisioned resulting in a first determination;
determining current network conditions associated with the first portion of the communication equipment resulting in a second determination;
obtaining historical network conditions associated with the first portion of the communication equipment;
determining predicted network conditions associated with the first portion of the communication equipment based on the historical network conditions resulting in a third determination;
generating, by the server, sample data based on the first determination, the second determination, historical network conditions, and the third determination, wherein the sample data comprises a group of sample data, wherein the generating of the first sample data comprises identifying a first group of values for the first parameter;
adjusting the sample data by ranking each sample data of the group of sample data according to the current network conditions, historical network conditions, and the predicted network conditions resulting in an adjusted sample data, wherein the adjusted sample data comprises groups of values, wherein each of the current network conditions, the historical network conditions, and the predicted network conditions comprise a latency associated with the communication network; and
providing, over the communication network, the first group of values of the groups of values from the adjusted sample data to the user interface as the first sample data, wherein the first group of values is a highest ranked group of values of the groups of values from the adjusted sample data according to the ranking.

2. The distributed microservice system of claim 1, wherein the communication equipment comprises a plurality of modules, wherein the first portion of the communication equipment is one of the plurality of modules.

3. The distributed microservice system of claim 1, wherein the user interface receives a first user-generated input that indicates the first request, wherein the user interface provides the first request to the server.

4. The distributed microservice system of claim 3, wherein the operations further comprise:
receiving a second user-generated input from the user interface that indicates configuring the first parameter to a first value from the first group of values; and
configuring the first parameter to the first value according to the second user-generated input.

5. The distributed microservice system of claim 1, wherein the receiving of the first request comprises extracting metadata from a messaging layer of a communication protocol associated with a message that includes the metadata for the server.

6. The distributed microservice system of claim 5, wherein the user interface generates the metadata that comprises the first request, wherein the user interface providing of the first request comprises providing the metadata in the messaging layer.

7. The distributed microservice system of claim 1, wherein the user interface comprises one of a command line interface (CLI), network configuration protocol (NETCONF), representational state transfer (REST), or a web browser.

8. The distributed microservice system of claim 1, wherein the user interface presents the first group of values on a display.

9. The distributed microservice system of claim 8, wherein the display is remotely located from the server.

10. The distributed microservice system of claim 1, wherein the adjusting of the sample data comprises determining network metrics associated with the first portion of the communication equipment.

11. The distributed microservice system of claim 10, wherein the adjusting of the sample data comprises adjusting the sample data according to the network metrics.

12. A non-transitory machine-readable storage medium, comprising executable instructions that, when executed by a server including a processor, facilitate performance of operations, the operations comprising:
receiving, over a communication network via a user interface, a first request for first sample data for a first parameter associated with a first microservice, wherein the first sample data is associated with a first portion of a communication equipment, wherein the server is configured to perform the first microservice;
determining a second portion of the communication equipment is provisioned resulting in a first determination;
determining current network conditions associated with the first portion of the communication equipment resulting in a second determination;
obtaining historical network conditions associated with the first portion of the communication equipment;
determining predicted network conditions associated with the first portion of the communication equipment based on the historical network conditions resulting in a third determination;
generating, by the server, sample data based on the first determination, the second determination, historical network conditions, and the third determination, wherein the sample data comprises a group of sample data, wherein the generating of the sample data comprises identifying a first group of values for the first parameter;
adjusting the sample data by ranking each sample data of the group of sample data according to the current network conditions, historical network conditions, and the predicted network conditions resulting in an adjusted sample data, wherein the adjusted sample data comprises groups of values, wherein each of the current network conditions, the historical network conditions, and the predicted network conditions comprise a latency associated with the communication network; and providing, over the communication network, the first group of values of the groups of values from the adjusted sample data to the user interface as the first sample data, wherein the first group of values is a highest ranked group of values of the groups of values from the adjusted sample data according to the ranking.

13. The non-transitory machine-readable storage medium of claim 12, wherein the user interface presents the first group of values on a display.

14. The non-transitory machine-readable storage medium of claim 13, wherein the display is remotely located from the server.

15. The non-transitory machine-readable storage medium of claim 12, wherein the communication equipment comprises a plurality of modules, wherein the first portion of the communication equipment is one of the plurality of modules.

16. The non-transitory machine-readable storage medium of claim 12, wherein the user interface comprises one of a command line interface (CLI), network configuration protocol (NETCONF), representational state transfer (REST), or a web browser.

17. The non-transitory machine-readable storage medium of claim 12, wherein the adjusting of the sample data comprises determining network metrics associated with the first portion of the communication equipment.

18. The non-transitory machine-readable storage medium of claim 17, wherein the adjusting of the sample data comprises adjusting the sample data according to the network metrics.

19. A method, comprising:
receiving, by a server including a processor, over a communication network via a user interface, a first request for first sample data for a first parameter associated with a first microservice, wherein the first sample data is associated with a first portion of a communication equipment, wherein the server is configured to perform the first microservice;

determining, by the server, a second portion of the communication equipment is provisioned resulting in a first determination;

determining, by the server, current network conditions associated with the first portion of the communication equipment resulting in a second determination;

obtaining, by the server, historical network conditions associated with the first portion of the communication equipment;

determining, by the server, predicted network conditions associated with the first portion of the communication equipment based on the historical network conditions resulting in a third determination;

generating, by the server, sample data based on the first determination, the second determination, historical network conditions, and the third determination, wherein the sample data comprises a group of sample data, wherein the generating of the sample data comprises identifying, by the server, a first group of values for the first parameter;

adjusting, by the server, the sample data by ranking each sample data of the group of sample data according to the current network conditions, historical network conditions, and the predicted network conditions resulting in adjusted sample data, wherein the adjusted sample data comprises groups of values, wherein each of the current network conditions, the historical network conditions, and the predicted network conditions comprise a latency associated with the communication network; and providing, by the server, over the communication network, the first group of values of the groups of values from the adjusted sample data to the user interface as the first sample data, wherein the first group of values is a highest ranked group of values of the groups of values from the adjusted sample data according to the ranking.

20. The method of claim 19, wherein the communication equipment comprises a plurality of modules, wherein the first portion of the communication equipment is one of the plurality of modules.

* * * * *